(12) United States Patent
Holtzman et al.

(10) Patent No.: US 10,291,936 B2
(45) Date of Patent: May 14, 2019

(54) OVERCOMING LOST OR CORRUPTED SLICES IN VIDEO STREAMING

(71) Applicant: Gamefly Israel Ltd., Caesarea (IL)

(72) Inventors: Tomer Holtzman, Haifa (IL); Yahav Zamari, Atlit (IL); Asaf Barak, Yokneam (IL); Iddit Shalem, Zichron Yaakov (IL)

(73) Assignee: Electronic Arts Inc., Redwood City, CA (US)

( * ) Notice: Subject to any disclaimer, the term of this patent is extended or adjusted under 35 U.S.C. 154(b) by 85 days.

(21) Appl. No.: 15/677,463

(22) Filed: Aug. 15, 2017

(65) Prior Publication Data

US 2019/0058898 A1 Feb. 21, 2019

(51) Int. Cl.
| | |
|---|---|
| H04N 19/65 | (2014.01) |
| H04N 21/234 | (2011.01) |
| H04N 19/136 | (2014.01) |
| H04N 19/174 | (2014.01) |
| H04N 19/132 | (2014.01) |

(52) U.S. Cl.
CPC .......... H04N 19/65 (2014.11); H04N 19/132 (2014.11); H04N 19/136 (2014.11); H04N 19/174 (2014.11); H04N 21/23418 (2013.01)

(58) Field of Classification Search
CPC .... H04N 19/65; H04N 19/132; H04N 19/136; H04N 19/174; H04N 21/23418
See application file for complete search history.

(56) References Cited

U.S. PATENT DOCUMENTS

| | | | |
|---|---|---|---|
| 5,659,539 | A | 8/1997 | Porter et al. |
| 5,825,425 | A | 10/1998 | Kazui et al. |
| 6,081,296 | A | 6/2000 | Fukunaga et al. |
| 6,104,757 | A | 8/2000 | Rhee |
| 6,611,561 | B1 | 8/2003 | Hannuksela et al. |
| 6,683,988 | B1 | 1/2004 | Fukunaga et al. |
| 6,732,313 | B2 | 5/2004 | Fukushima et al. |

(Continued)

OTHER PUBLICATIONS

Final Office Action dated Nov. 30, 2105, for U.S. Appl. No. 13/898,150, filed May 20, 2013, twelve pages.

(Continued)

*Primary Examiner* — Zhihan Zhou
(74) *Attorney, Agent, or Firm* — McDermott Will & Emery LLP (57) ABSTRACT

A method, system and Computer program code for analyzing a video stream, the method comprising: receiving a sequence of communication packets associated with a frame, wherein each packet comprises an indication of whether the packet comprises a slice header, and an indication to a frame number; retrieving slices associated with the frame from the sequence of communication packets until a missing or corrupted slice, or an end of the frame is encountered; subject to no missing or corrupted slice encountered, providing the slices associated with the frame to a handling unit; and subject to a missing or corrupted slice encountered: skipping data from a beginning of the missing or corrupted frame, until a header start indicator or until an end of the frame; creating a P-skip slice; providing the P-skip slice to the handling unit; and resuming retrieving the slices subject to the end of the frame not being encountered.

20 Claims, 3 Drawing Sheets

(56) References Cited

U.S. PATENT DOCUMENTS

| | | |
|---|---|---|
| 7,120,308 B2 | 10/2006 | Guleryuz |
| 7,146,053 B1 | 12/2006 | Rijavec et al. |
| 7,209,520 B2 | 4/2007 | Kadono et al. |
| 7,526,026 B2 | 4/2009 | Kadono et al. |
| 7,742,529 B1 | 6/2010 | Ghanbari |
| 7,764,737 B2 | 7/2010 | Setton et al. |
| 7,802,168 B1 | 9/2010 | Apostolopoulos et al. |
| 8,238,427 B2 | 8/2012 | Nagori |
| 8,335,388 B2 | 12/2012 | Satou et al. |
| 8,355,437 B2 | 1/2013 | Hannuksela |
| 8,379,734 B2 | 2/2013 | Teng et al. |
| 8,503,444 B2 | 8/2013 | Suneya |
| 8,503,528 B2 | 8/2013 | Grange et al. |
| 8,605,785 B2 | 12/2013 | Henocq et al. |
| 8,630,346 B2 | 1/2014 | Chappalli et al. |
| 8,634,413 B2 | 1/2014 | Lin et al. |
| 8,654,863 B2 | 2/2014 | Hannuksela |
| 8,693,540 B2 | 4/2014 | Shi et al. |
| 8,780,986 B2 | 7/2014 | Wu et al. |
| 8,804,821 B2 | 8/2014 | Ali |
| 8,929,443 B2 | 1/2015 | Crinon et al. |
| 8,958,486 B2 | 2/2015 | Rodriguez et al. |
| 9,407,923 B2 | 8/2016 | Barak |
| 9,479,800 B2 | 10/2016 | NepomucenoLeung et al. |
| 2004/0218673 A1 | 11/2004 | Wang et al. |
| 2005/0008240 A1* | 1/2005 | Banerji ............... H04N 5/2624 |
| | | 382/238 |
| 2005/0123045 A1 | 6/2005 | Hannuksela |
| 2006/0104366 A1 | 5/2006 | Huang et al. |
| 2006/0133514 A1 | 6/2006 | Walker |
| 2007/0086527 A1 | 4/2007 | Yan |
| 2007/0147517 A1 | 6/2007 | Hu |
| 2008/0049845 A1 | 2/2008 | Liu |
| 2008/0198929 A1 | 8/2008 | Fujihara |
| 2008/0232478 A1 | 9/2008 | Teng et al. |
| 2009/0052531 A1 | 2/2009 | Mulroy et al. |
| 2009/0103617 A1 | 4/2009 | Au et al. |
| 2009/0144596 A1* | 6/2009 | Mohan .................. G11B 20/18 |
| | | 714/746 |
| 2009/0213940 A1* | 8/2009 | Steinbach ............ H04N 19/176 |
| | | 375/240.27 |
| 2009/0252227 A1 | 10/2009 | NepomucenoLeung et al. |
| 2010/0050225 A1 | 2/2010 | Bennett |
| 2010/0067578 A1 | 3/2010 | Nakagawa |
| 2010/0177776 A1 | 7/2010 | Crinon et al. |
| 2012/0079329 A1 | 3/2012 | Steinbach et al. |
| 2012/0219073 A1 | 8/2012 | NepomucenoLeung et al. |
| 2013/0058394 A1* | 3/2013 | Nilsson ................ H04N 19/503 |
| | | 375/240.02 |
| 2016/0227235 A1* | 8/2016 | Frishman ............. H04N 19/172 |
| 2016/0227257 A1* | 8/2016 | Frishman ............. H04N 19/895 |
| 2016/0330487 A1 | 11/2016 | Barak |

OTHER PUBLICATIONS

Final Office Action dated Jun. 8, 2017, for U.S. Appl. No. 15/214,298, filed Jul. 19, 2016, 11 pages.

Non-Final Office Action dated May 29, 2105, for U.S. Appl. No. 13/898,150, filed May 20, 2013, nine pages.

Non-Final Office Action dated Dec. 14, 2016, for U.S. Appl. No. 15/214,298, filed Jul. 19, 2016, 13 pages.

Notice of Allowance dated Apr. 5, 2016, for U.S. Appl. No. 13/898,150, filed May 20, 2013, eight pages.

* cited by examiner

OVERCOMING LOST OR CORRUPTED SLICES IN VIDEO STREAMING

TECHNICAL FIELD

The present disclosure relates to media streaming in general, and to a method and apparatus for overcoming lost or corrupted video frames in media streaming, in particular.

BACKGROUND

Streaming media relates to constantly delivering media by a provider over a period of time, the media to be received by a client and optionally displayed to a user.

Streaming may be used for any type of information such as data, audio or video, and content such as music, movies, games, closed captioning, stock ticker, real-time text, medical operations, or any other data to be streamed or broadcast. Common environments or applications of streaming media include but are not limited to interactive television information systems such as video on-demand (VoD) providing pre-ready contents or games, and internet television.

Streaming media has become more and more popular due to a number of reasons, including the increased available network bandwidth, especially in the last mile, increased access to and commercialization of networks, especially the Internet, and the use of standard protocols and formats, such as TCP/IP, HTTP, and HTML.

Some streaming applications use User Datagram Protocol (UDP), especially in broadcast services. UDP is generally an unreliable protocol and is vulnerable to lost IP packets.

It will be appreciated that the loss of even a single packet may have a large impact on the video quality at the subscriber side, for example at the set top box (STB). For example, when H.264/MPEG-4 compression is used, a frame may be expressed relatively to a previous frame, e.g. indicating only the changes from the previous frame. Thus, if a frame or part thereof is lost, subsequent frames may become useless as well. This is particularly harmful in environments in which low latency is important, such as gaming.

BRIEF SUMMARY OF THE INVENTION

One exemplary embodiment of the disclosed subject matter is a computer-implemented method for analyzing a video stream, the method performed by a client computerized device, the method comprising: receiving a sequence of communication packets associated with a frame, wherein each packet in the sequence of communication packets comprises an indication in a predetermined location within a header of the packet of whether the packet comprises a slice header or not, and an indication to a frame number; retrieving slices associated with the frame from the sequence of communication packets until a missing or corrupted slice, or an end of the frame is encountered; subject to no missing or corrupted slice encountered, providing the slices associated with the frame to a handling unit; and subject to a missing or corrupted slice encountered: skipping data from a beginning location of the missing or corrupted frame, until a header start indicator or until an end of the frame; creating a P-skip slice; providing the P-skip slice to the handling unit; and resuming retrieving the slices subject to the end of the frame not being encountered. The method can further comprise indicating on each packet a number of a frame with which information within the packet is associated. Within the method, said indicating is optionally performed by a server prior to transmitting the packet to the client computerized device. The method can further comprise indicating on each packet whether the packet comprises a slice start. Within the method, said indicating is optionally performed by a server prior to transmitting the packet to the client computerized device. The method can further comprise decrypting the packet. Within the method, the frame is optionally encoded in accordance with ITU-T H264 or H265 recommendation.

Another exemplary embodiment of the disclosed subject matter is a computerized apparatus having a processor and a storage device the processor being adapted to perform the steps of: receiving a sequence of communication packets associated with a frame within a video stream, wherein each packet in the sequence of communication packets comprises an indication in a predetermined location within a header of the packet of whether the packet comprises a slice header or not, and an indication to a frame number; retrieving slices associated with the frame from the sequence of communication packets until a missing or corrupted slice, or an end of the frame is encountered; subject to no missing or corrupted slice encountered, providing the slices associated with the frame to a handling unit; and subject to a missing or corrupted slice encountered: skipping data from a beginning location of the missing or corrupted frame, until a header start indicator or until an end of the frame; creating a P-skip slice; providing the P-skip slice to the handling unit; and resuming retrieving the slices subject to the end of the frame not being encountered. Within the apparatus, the processor is optionally further adapted to indicate on each packet a number of a frame with which information within the packet is associated. Within the apparatus said indicating is optionally performed by a server prior to transmitting the packet to the client computerized device. Within the apparatus the processor is optionally further adapted to indicate on each packet whether the packet comprises a slice start. Within the apparatus said indicating is optionally performed by a server prior to transmitting the packet to the client computerized device. Within the apparatus, the processor is optionally further adapted to decrypt the packet. Within the apparatus the frame is optionally encoded in accordance with ITU-T H264 or H265 recommendation.

Yet another exemplary embodiment of the disclosed subject matter is a computer program product comprising a non-transitory computer readable medium retaining program instructions, which instructions when read by a processor, cause the processor to perform a method comprising: receiving a sequence of communication packets associated with a frame, wherein each packet in the sequence of communication packets comprises an indication in a predetermined location within a header of the packet of whether the packet comprises a slice header or not, and an indication to a frame number; retrieving slices associated with the frame from the sequence of communication packets until a missing or corrupted slice, or an end of the frame is encountered; subject to no missing or corrupted slice encountered, providing the slices associated with the frame to a handling unit; and subject to a missing or corrupted slice encountered: skipping data from a beginning location of the missing or corrupted frame, until a header start indicator or until an end of the frame; creating a P-skip slice; providing the P-skip slice to the handling unit; and resuming retrieving the slices subject to the end of the frame not being encountered. Within the computer program product, the processor can further indicate on each packet a number of a frame with which information within the packet is associated. Within the computer program product, said indicating is optionally performed by a server prior to transmitting the packet to the client computerized device. Within the computer program product, the processor can further indicate on each packet whether the packet comprises a slice start. Within the computer program product, said indicating is optionally performed by a server prior to transmitting the packet to the client computerized device. Within the computer program product, the frame is optionally encoded in accordance with ITU-T H264 or H265 recommendations.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to overcome lost or corrupted slices within one or more frames in a transmitted video stream. Generally, lost slices occur in situations wherein the full slice is missing, due to one or more packets containing the whole slice information not being received. A corrupt slice may occur if a packet containing part but not all of the slice information is not received. Lost or corrupted slices are hereinafter collectively referred to as "lost slices".

Lost slices can cause handling delays due to the error recovery required by the video decoding unit. Additionally, not all video decoding units are adapted to recover from all types of errors, thus the system may even crash in certain circumstances.

The problem of lost slices is particularly critical in environments in which latency is critical, thus recovering from the loss should be performed without introducing significant delays.

One technical solution comprises marking each transmitted packet with a number, such as a serial number of the frame which the packet contains information of, and with a Boolean indication of whether the packet comprises a beginning of a slice within the frame or not. The marking may be done by a server prior to transmitting the packets to a client device, such as a set top box, a home computer, or the like.

As long as packets are received and a sequence of slices is retrieved successfully without lost slices, no further actions need to be taken by the client device.

Once a lost or corrupt slice is encountered, due to one or more packets comprising some or all of the slice data being missing, the slice data that has been received, if any, and all data until a new slice header is encountered, is ignored. Thus, in each proceeding packet, if the packet comprises a negative indication of containing a slice header, then the whole packet is ignored since the missing slice goes on at least until the end of that packet. Once a packet with a positive indication of a slice header is encountered, information within the packet up to the slice header, if any, is ignored, after which a new slice begins and may be retrieved.

Additionally, one or more P-skip slices are generated as a replacement to the one or more missing slices, and provided to the handling unit, such as a video decoder. A P-skip slice causes no change in the corresponding area of the rendered frame. Since a P-skip slice or an equivalent thereof is a part of the relevant standard, such as H. 264, any video decoder is configured to and can handle a P-skip slice without encountering any error, thus no error correction is required from the decoder.

One technical effect of the disclosed subject matter relates to the efficient manner of handling lost slices, such that at most one packet needs to be scanned where no slice is generated. Thus, a frame or part thereof may "freeze", but no undesired effects are created, nor is latency introduced, which is particularly suitable for applications requiring low latency, such as gaming.

Another technical effect of the disclosed subject matter relates to the operability of any video decoder with slices generated in accordance with the disclosure, since the video decoder does not encounter missing slices, but P-skip slices at the worst case.

Figure 1:
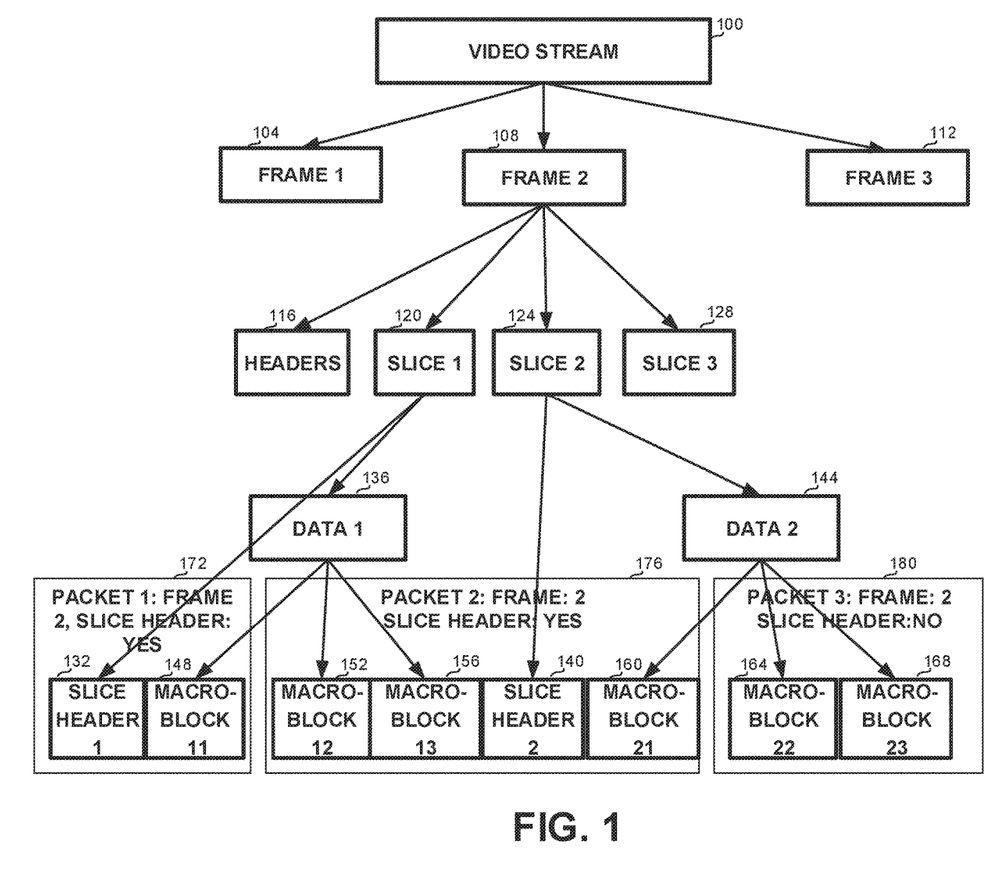
FIG. 1 shows an illustrative example of the logical and physical transmitted entities, in accordance with some exemplary embodiments of the disclosed subject matter.

Referring now to FIG. 1, showing an illustrative example of the logical and physical entities transmitted during video streaming, in accordance with some exemplary embodiments of the disclosed subject matter.

Logically, a video stream 100 to be transmitted is comprised of a sequence of frames, such as frame 1 (104), frame 2 (108), and frame 3 (112). It will be appreciated that a sequence of frames, also referred to as group of pictures (GOP) may comprise a reference frame, also referred to as an I-frame which comprises the full frame content, and a multiplicity of P-frame, which only indicate changes between the current frame and the last transmitted I-frame or P-frame.

Each frame is preceded by one or more headers 116. For example, in the H264 protocol the headers include, among others, a sequence parameter set (SPS) and a picture parameter set (PSP). Following the headers are one or more slices such as slice 1 (120), slice 2 (124) and slice 3 (128). Each header or slice may be referred to as Network Abstraction Unit (NAL).

Each slice comprises a slice header such as slice header 1 (132) and slice header 2 (140), and slice data, such as data 1 (136) and data 2 (144).

Each data can be comprised of a multiplicity of macroblocks, for example data 1 (136) comprises macroblock 11 (148), macroblock 12 (152), and macroblock 13 (156), and data 2 (144) comprises macroblock 21 (160), macroblock 22 (164), and macroblock 23 (168). Some macroblocks, which represent no change relatively to the corresponding macroblocks in a previous frame and thus no encoded data, are referred to as skip macroblocks.

A physical stream is comprised of a sequence of packets, wherein each packet comprises one or more slices or parts thereof. Thus, a packet can comprise a part of one slice, a part of one slice and a part of the next slice, a part of one slice, one or more full slices and a part of a proceeding slice.

In the current example, the transmitted stream comprises packet 1 (172), packet 2 (176), and packet 3 (180), wherein packet 1 (172) comprises slice header 1 (132) and macroblock 11 (148); packet 2 (176) comprises macroblock 12 (152), macroblock 13 (156), slice header 2 (140) and macroblock 21 (160); and packet 3 (180) comprises macroblock 22 (164), and macroblock 23 (168). It will be appreciated that each packet may also comprise a header.

In order to overcome lost slices, each packet comprises an indication, for example as part of the header, to the number of the frame the data belongs to, thus each of packet 1 (172), packet 2 (176), and packet 3 (180) comprises an indicator referring to frame 2.

Additionally, each packet comprises an indication of whether it comprises a slice header or not, i.e., whether a new slice starts within the packet. Thus, packet 1 (172) in which slice 1 starts and packet 2 (176) in which slice 2 starts are indicated as comprising a slice header, while packet 3 (180) is indicated as not comprising a slice header.

It will be appreciated that the illustration of FIG. 1 shows only examples of the entities for explanatory purposes and does not span a full blown example.

Figure 2:
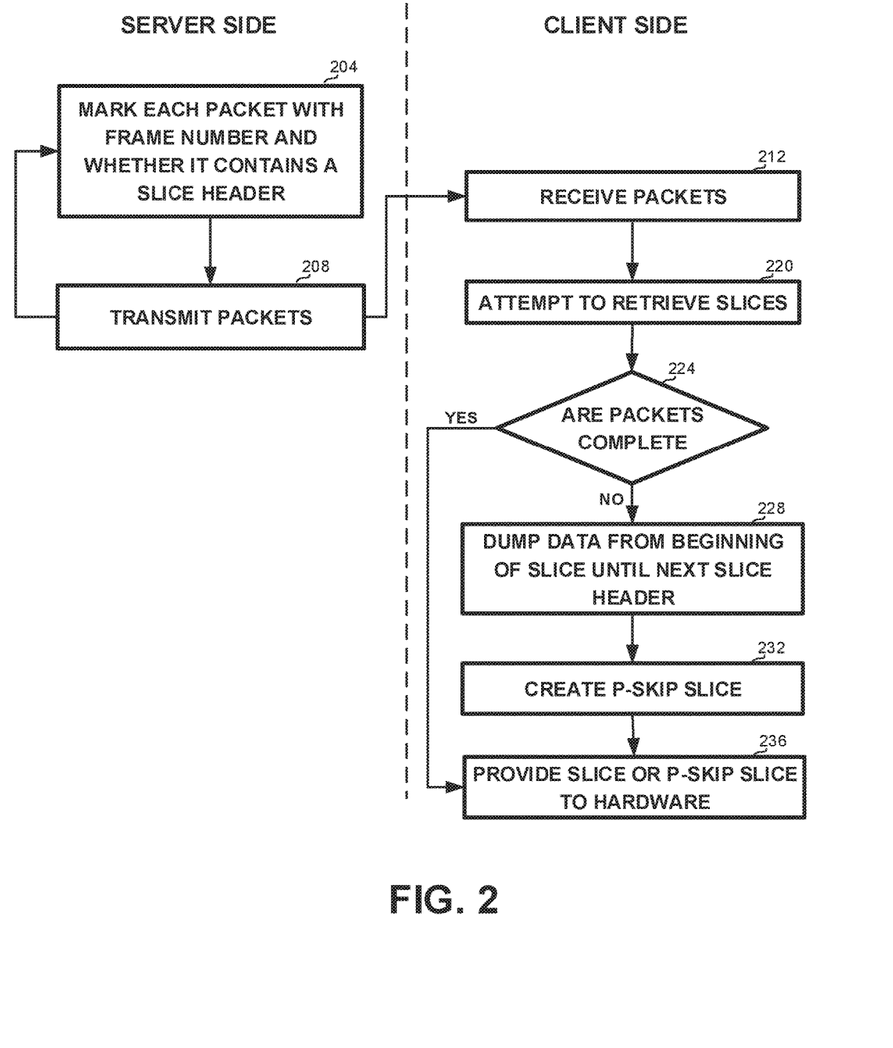
FIG. 2 shows a flowchart diagram of steps in a method for recovering from a lost or corrupted slices, in accordance with some exemplary embodiments of the disclosed subject matter.

Referring now to FIG. 2, showing a flowchart diagram of steps in a method for recovering from lost slices, in accordance with some exemplary embodiments of the disclosed subject matter.

A server may prepare frames to be transmitted to a client device, or may receive such frames and pack them into packets for transmission.

On step 204 which may take place during the preparation of the packets to be transmitted to the client, each packet is marked with the number of the frame which the data in the packet relates to, and with an indicator of whether a slice is started anywhere in the packet, i.e., whether the packet comprises a slice header. It will be appreciated that the indicator may be Boolean and may be set to true regardless of whether the packet comprises one or a multiplicity of slice headers.

On step 208 the packet may be transmitted to the client side.

The process is repeated for every new packet to be transmitted to the client side.

On the client side, on step 212, the packets as transmitted, for example over the top, from the server are received at the client side.

On step 220, a processor at the client side or a processor associated with the client side may attempt to retrieve a sequence of slices from the sequence of received packets.

On step 224, it may be determined whether complete slices are retrieved and no slice is corrupted or lost.

As long as no slice is corrupted or lost, on step 236 the slices are provided to the video decoder handling the slices.

Otherwise, if a slice is missing or corrupt due to one or more missing packets, then on step 228 the data from the beginning of the slice or from the end of the previous slice, and until the next slice header is dumped or otherwise ignored. Thus, in the example of FIG. 1 above, if packet 1 (172) is missing, a slice header is found in packet 2 (176), thus the information of packet 2 (176) until slice header 2 (140) is ignored. If packet 2 (176) is missing, then slice 1 (120) will be corrupted, thus packet 1 (172) is ignored, and since packet 3 (180) contains no slice header it is ignored as well, thus resulting in the loss of three slices.

On step 232, one or more P-skip slices are created instead of the one or more lost slices, which when received by the decoder introduces no change to the relevant part of the frame, thus reducing to minimum the disruption caused by the missing frame.

On step 236, the P-skip slices, if created are provided to the video decoder.

It will be appreciated that the method can also comprise an encryption step on the server side and a corresponding decryption step on the client side.

Figure 3:
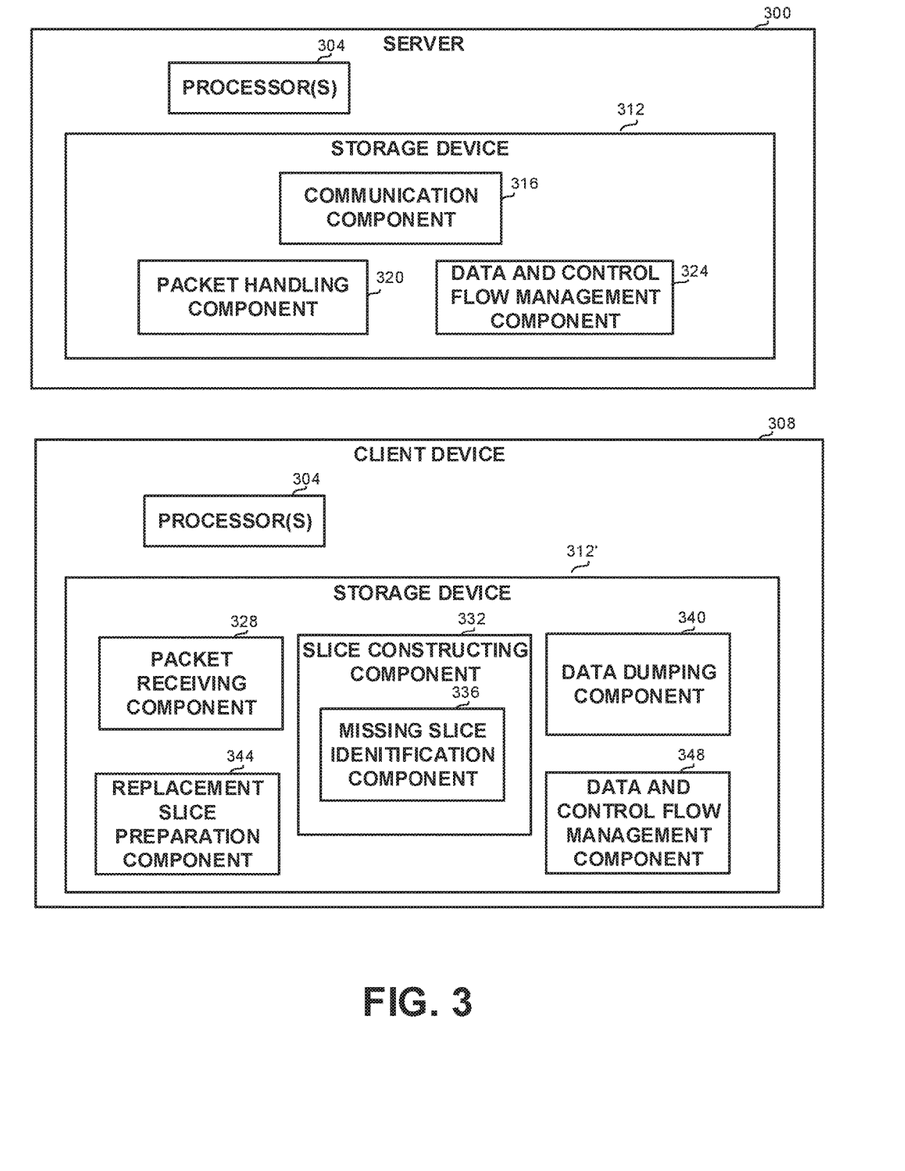
FIG. 3 shows a block diagram of an apparatus for recovering from lost or corrupted slices, in accordance with some exemplary embodiments of the disclosed subject matter.

FIG. 3 shows a block diagram of an apparatus for recovering from lost or corrupted slices, in accordance with some exemplary embodiments of the disclosed subject matter.

The apparatus comprises one or more servers 300 and one or more client devices 308, wherein any of the servers may be located at a transmission station or anywhere else, including on cloud storage, and each client device (308) may be located at a location such as a home, a business, or the like. Typically, each server may provide services to a multiplicity of client devices. In some embodiments, and a client device may receive services from one or more servers.

Each server 300 and client device 308 may be implemented as a computing device, which may comprise or be operatively connected to one or more processors 304. Any of processors 304 may be a Central Processing Unit (CPU), a microprocessor, an electronic circuit, an Integrated Circuit (IC) or the like. Alternatively, any server 300 or client device 308 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by server 300 or client device 308 or any of their subcomponents.

In some embodiments, server 300 or client device 308 may comprise one or more storage devices 312 or 312' for storing executable components, and which may also contain data during execution of one or more components. Each storage device 312 or 312' may be persistent or volatile. For example, storage device 312 or 312' can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, any storage device 312 or 312' may retain program code operative to cause any of processors 304 to perform acts associated with any of the steps shown in FIG. 2 above, for example marking packets, retrieving slices, creating P-skip slices, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

Storage device 312 of server 300 may comprise communication component 316 for receiving information such as pictures from a source such as a video game, a camera, or others; generating frames and transmitting the information in packets, marked as detailed above to one or more client devices 308. Transmission can use any protocol, for example UDP. It will be appreciated that in some examples the pictures can also be generated by server 300 rather than received.

Storage device 312 of server 300 may comprise packet handling component 320 for receiving packets and possibly additional information, such as the frame each packet relates to, and marking each packet with an indication of the relevant frame and with an indication of whether the packet comprises a header start.

Storage device 312 may comprise data and control flow management component 324, for managing the information and control flow among the detailed components, for example, receiving pictures, preparing packets, marking packets and transmitting them.

It will be appreciated that storage device 312 of server 300 may comprise additional components related to its operation, including for example security handling, encryption, generating the content or others.

Storage device 312 of client device 308 may comprise packet receiving component 328 for receiving a packet stream from server 300 with the same protocol in which the packets were sent.

Storage device 312 of client device 308 may comprise slice constructing component 332 for retrieving slices from the packets.

Slice constructing component 332 may include missing slice identification component 336, which is operative in identifying situations in which a slice is corrupted or one or more slices are missing, due for example to missing packets.

Storage device 312 of client device 308 may comprise data dumping component 340 for dumping data related to a corrupt or missing slice, from the beginning of the corrupt slice until a next slice header, whether it is within the same packet, a previous packet or a next one.

Storage device 312 of client device 308 may comprise replacement slice preparation component 344 for preparing or otherwise obtaining a replacement slice, which may be a P-skip slice that has little effect on the rendered stream.

Storage device 312 of client device 308 may comprise data and control flow management component 348, for managing the information and control flow among the detailed components, for example, receiving packets by packet receiving component 328, providing the packets to slice constructing component 332, calling data dumping component 340 and replacement slice preparation component 344, and inserting a P-skip slice instead of the one or more corrupt or missing slices.

It will be appreciated that each of the described server and client device may comprise a multiplicity of additional components responsible for additional functionalities as known or as will become known in the art.

It will be appreciated that the disclosed method and apparatus are not limited to frames comprising images, but can be applied also for transmitting or otherwise utilizing a stream of any type of data which may consist of frames comprised of macroblocks.

The disclosed methods and apparatus are not limited to a particular field and may be used in any application in which it is required to maintain lost packet recovery and low delay, wherein the information may be real-time information which may be generated prior to transmission.

The disclosed method and apparatus may operate with any encoding method that is currently known or that will become known in the future, such as but not limited to MPEG, ITU-T H264 recommendation, Joint Video Team of ISO/IEC MPEG, MPEG 2, H265, MP4 ITU-T VCEG, or any other currently known encoding method that may be effected by lost packets, or nay such method that will become known in the future.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for analyzing a video stream, the method performed by a client computerized device, the method comprising:
    receiving a sequence of communication packets associated with a frame, wherein each packet in the sequence of communication packets comprises an indication in a predetermined location within a header of the packet of whether the packet comprises a slice header or not, and an indication to a frame number;
    retrieving slices associated with the frame from the sequence of communication packets until a missing or corrupted slice, or an end of the frame is encountered;
    subject to no missing or corrupted slice encountered, providing the slices associated with the frame to a handling unit; and
    subject to a missing or corrupted slice encountered:
        skipping data from a beginning location of the missing or corrupted frame, until a header start indicator or until an end of the frame;
        creating a P-skip slice;
        providing the P-skip slice to the handling unit; and
        resuming retrieving the slices subject to the end of the frame not being encountered.

2. The computer-implemented method of claim 1, further comprising indicating on each packet a number of a frame with which information within the packet is associated.

3. The computer-implemented method of claim 2, wherein said indicating is performed by a server prior to transmitting the packet to the client computerized device.

4. The computer-implemented method of claim 1, further comprising indicating on each packet whether the packet comprises a slice start.

5. The computer-implemented method of claim 4, wherein said indicating is performed by a server prior to transmitting the packet to the client computerized device.

6. The computer-implemented method of claim 1, further comprising decrypting the packet.

7. The computer-implemented method of claim 1 wherein the frame is encoded in accordance with ITU-T H264 or H265 recommendation.

8. A computerized apparatus having a processor and a storage device the processor being adapted to perform the steps of:
    receiving a sequence of communication packets associated with a frame within a video stream, wherein each packet in the sequence of communication packets comprises an indication in a predetermined location within a header of the packet of whether the packet comprises a slice header or not, and an indication to a frame number;
    retrieving slices associated with the frame from the sequence of communication packets until a missing or corrupted slice, or an end of the frame is encountered;
    subject to no missing or corrupted slice encountered, providing the slices associated with the frame to a handling unit; and
    subject to a missing or corrupted slice encountered:
        skipping data from a beginning location of the missing or corrupted frame, until a header start indicator or until an end of the frame;
        creating a P-skip slice;
        providing the P-skip slice to the handling unit; and
        resuming retrieving the slices subject to the end of the frame not being encountered.

9. The apparatus of claim 8, wherein the processor is further adapted to indicate on each packet a number of a frame with which information within the packet is associated.

10. The apparatus of claim 9, wherein said indicating is performed by a server prior to transmitting the packet to the client computerized device.

11. The apparatus of claim 8, wherein the processor is further adapted to indicate on each packet whether the packet comprises a slice start.

12. The apparatus of claim 11, wherein said indicating is performed by a server prior to transmitting the packet to the client computerized device.

13. The apparatus of claim 8, wherein the processor is further adapted to decrypt the packet.

14. The apparatus of claim 8, wherein the frame is encoded in accordance with ITU-T H264 or H265 recommendation.

15. A computer program product comprising a non-transitory computer readable medium retaining program instructions, which instructions when read by a processor, cause the processor to perform a method comprising:
receiving a sequence of communication packets associated with a frame, wherein each packet in the sequence of communication packets comprises an indication in a predetermined location within a header of the packet of whether the packet comprises a slice header or not, and an indication to a frame number;
retrieving slices associated with the frame from the sequence of communication packets until a missing or corrupted slice, or an end of the frame is encountered;
subject to no missing or corrupted slice encountered, providing the slices associated with the frame to a handling unit; and
subject to a missing or corrupted slice encountered:
skipping data from a beginning location of the missing or corrupted frame, until a header start indicator or until an end of the frame;
creating a P-skip slice;
providing the P-skip slice to the handling unit; and
resuming retrieving the slices subject to the end of the frame not being encountered.

16. The computer program product of claim 15, wherein the processor can further indicate on each packet a number of a frame with which information within the packet is associated.

17. The computer program product of claim 16, wherein said indicating is performed by a server prior to transmitting the packet to the client computerized device.

18. The computer program product of claim 15, wherein the processor can further indicate on each packet whether the packet comprises a slice start.

19. The computer program product of claim 18, wherein said indicating is performed by a server prior to transmitting the packet to the client computerized device.

20. The computer program product of claim 15 wherein the frame is encoded in accordance with ITU-T H264 or H265 recommendations.

* * * * *